United States Patent [19]

Jones

[11] 4,056,229
[45] Nov. 1, 1977

[54] CAR WASH SPRAYER

[76] Inventor: Genevieve M. Jones, 10840 SE. 85th Ave., Portland, Oreg. 97266

[21] Appl. No.: 680,767

[22] Filed: Apr. 27, 1976

[51] Int. Cl.² ............................................. B05B 1/14
[52] U.S. Cl. ................................... 239/288; 239/559; 239/567
[58] Field of Search ............... 239/282, 283, 289, 273, 239/288, 559, 567

[56] References Cited
U.S. PATENT DOCUMENTS

| 1,539,331 | 5/1925 | Siemann | 239/559 |
| 1,962,793 | 6/1934 | Vogel | 239/282 |
| 2,785,010 | 3/1957 | Nelson | 239/282 |
| 2,893,644 | 7/1959 | Holden | 239/282 |
| 3,806,040 | 4/1974 | McCloy, Sr. | 239/562 X |

Primary Examiner—John J. Love
Attorney, Agent, or Firm—Lee R. Schermerhorn

[57] ABSTRACT

A sprinkler head has a hollow body with a suction cup on its underside for mounting on the roof of an automobile. The sprinkler head is supplied with water through a hose connection and perforations in the top of the hollow body discharge a spray of water over the automobile, leaving the operator's hands free to mop the surfaces to be cleaned. A shield of soft material underlies the hose connection to prevent the hose connection from marring the surface of the roof.

1 Claim, 3 Drawing Figures

CAR WASH SPRAYER

BACKGROUND OF THE INVENTION

This invention relates to a car wash sprayer for mounting on the roof of an automobile to facilitate the washing of the vehicle.

In washing an automobile, it is usually preferred to use a long handled mop so that the operator may remain at some distance from the grime and spatter of the operation. Such a mop requires the use of both hands, making it very difficult, if not impossible, to apply water at the same time. If the water is supplied by a garden hose, it is necessary to lay down the hose while manipulating the mop and to lay down the mop while manipulating the hose. This is, of course, inconvenient and time consuming.

The only other alternative is to use a short handled mop which can be manipulated with one hand and then hold the water supply hose in the other hand. This is ordinarily not an acceptable procedure because it subjects the operator to the grime and spatter of the washing operation.

Objects of the present invention are, therefore, to provide a car wash sprayer which may be mounted on the vehicle so as to leave both hands of the operator free for manipulating a long handled mop so that the operator may remain at a distance from the washing operation, and to provide a device for the purpose described which is of simple and inexpensive construction and easy to use on the garage driveway of the average home.

SUMMARY OF THE INVENTION

The present car wash sprayer comprises a sprinkler head having a hollow body with a suction cup on its underside for mounting on the roof of the automobile to be washed. Perforations in the top of the hollow body discharge a spray of water over the vehicle. The sprinkler head has a connection for a garden hose to furnish a supply of water. A protective shield underlies the hose connection to prevent marring the vehicle.

The invention will be better understood and additional objects and advantages will become apparent from the following detailed description of the preferred embodiment illustrated on the accompanying drawing. Various changes may be made in the details of construction and arrangement of parts and certain features may be used without others. All such modifications within the scope of the appended claims are included in the invention.

DESCRIPTION OF THE PREFERRED EMBODIMENT

Figure 1:
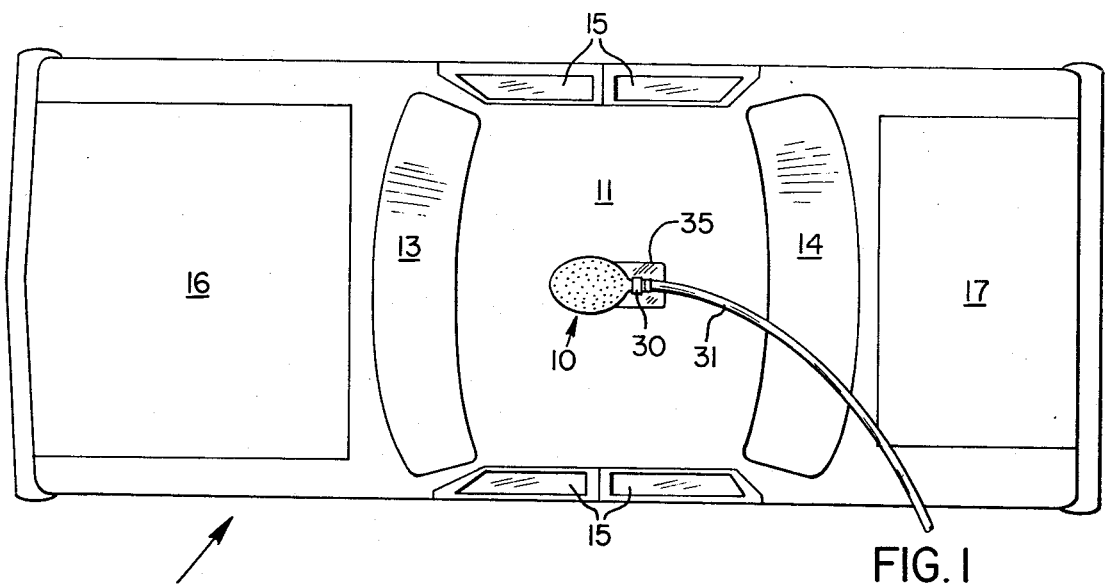
FIG. 1 is a top plan view showing the car wash sprayer mounted on the roof of an automobile according to the invention.
Figure 2:
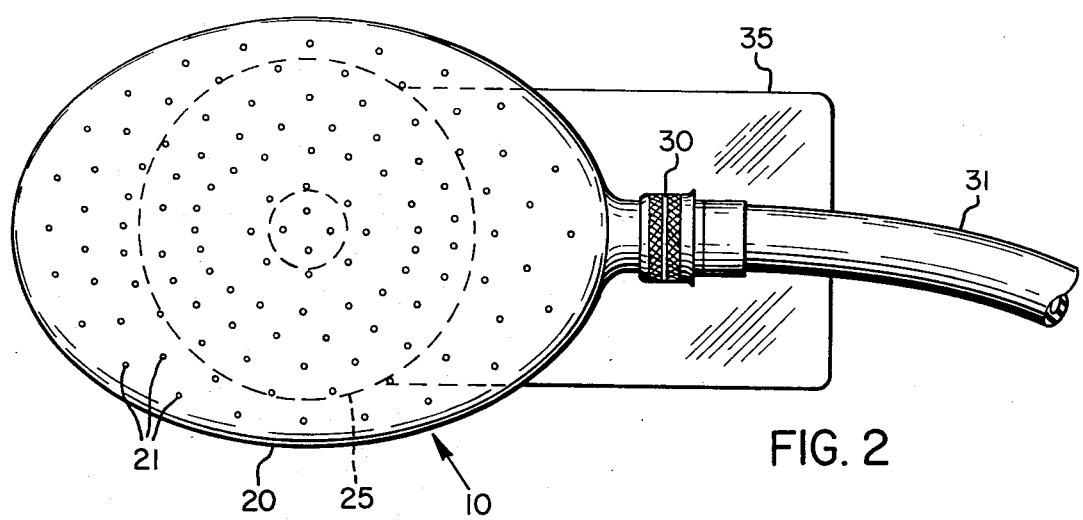
FIG. 2 is an enlarged top plan view of the car wash sprayer.
Figure 3:
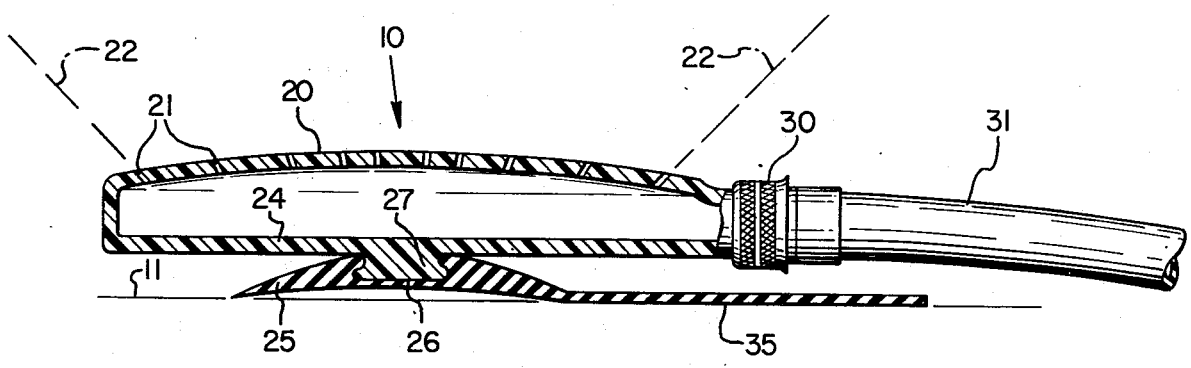
FIG. 3 is a vertical sectional view of the car wash sprayer.

FIG. 1 is a top plan view showing a car wash sprayer 10 embodying the invention mounted on the roof 11 of an automobile 12 to be washed. The sprayer 10 comprises a sprinkler head adapted to discharge a spray of water upward and outward in all directions so as to wet and flush the roof 11, windshield 13, rear window 14, sloping side windows 15 and at least portions of the front hood 16 and rear trunk lid 17.

As water is supplied to these areas, the operator's hands are left free to manipulate a long handled mop for washing the areas directly subject to the spray and for spreading the wash water to more remote areas which may not be reached directly by the spray, such as the front end of hood 16, the rear end of trunk lid 17 and the lower side surfaces. The necessary detergent may be applied to the mop or directly to the surfaces to be washed.

The sprayer 10 comprises a sprinkler head having a hollow body 20 with perforations 21 in its upper side inclined to discharge sprays of water upwardly and outwardly in all directions as indicated by broken lines 22. Hollow body 20 may be made of plastic or metal and the top and bottom parts may be formed separately and joined together in a peripheral seam or joint, not shown. Such details of construction depend upon the particular material of which the hollow body is made and are not important to the essential features of the invention.

Means are provided on bottom wall 24 for mounting a resilient suction cup 25 which provides temporary attachment to the vehicle roof 11. In the illustrated embodiment, such mounting means comprises a socket recess 26 in the top of the suction cup which receives a button 27 which is formed as an integral part of bottom wall 24. Such attachment allows the suction cup to be made of an appropriate material different from the material which forms bottom wall 24.

One side of hollow body 20 is provided with a screw type hose connector fitting 30 to connect with a garden hose 31 as a source of water supply. In order to prevent the connector fitting from marring the roof of the automobile, a shield 35 of soft material is arranged to underlie the connector fitting. This shield may be formed as a part of bottom wall 24 if wall 24 is made of a soft material, but in the present embodiment the shield is formed as an integral part of suction cup 25.

This arrangement is particularly advantageous if bottom wall 24 is formed as a hard plastic or metal which would not be suitable for shield 35. The physical characteristics required for suction cup 25 are appropriate for shield 35 so it is economical to make these two parts in one piece as shown, the shield 35 being merely an extension or flap extending from one side of the suction cup.

If the vehicle roof 11 is quite large, it is, of course, a simple matter to shift the sprayer 10 from one position to another on the roof as the washing proceeds. Also, of course, the sprayer 10 may be mounted with equal facility on hood 16 and trunk lid 17 if desired. Thus, the sprayer is adaptable to the convenience of the user.

What is claimed is:

1. A car wash sprayer comprising a sprinkler head having a hollow body with a top side and a bottom side, a downwardly protruding button formed integral with said bottom side in one-piece construction, perforations in said top side arranged to discharge a water spray upwardly and outwardly in all directions from said body, a water supply hose connection having a rotatable connector fitting extending laterally from said body, a suction cup having a socket recess receiving said button, and a flat flap formed integral with said suction cup in one-piece construction and extending from one side of said suction cup to lie flat on a surface supporting said suction cup and shield said surface from contact with said hose connection without interfering with the manipulation of said connector fitting.

* * * * *